United States Patent [19]
Heldwein et al.

[11] Patent Number: 6,095,504
[45] Date of Patent: Aug. 1, 2000

[54] SUPPORTS FOR STACKED FRACTIONATION TRAY END PIECES

[75] Inventors: Thomas C. Heldwein, Lockport; Nicholas F. Urbanski, De Pew; Aaron J. Muck, Clarence; Michael R. Resetarits, De Pew, all of N.Y.

[73] Assignee: UOP LLC, Des Plaines, Ill.

[21] Appl. No.: 09/275,248

[22] Filed: Mar. 24, 1999

[51] Int. Cl.⁷ ........................................ B01F 3/04
[52] U.S. Cl. ........................................ 261/114.5; 202/158
[58] Field of Search ............. 261/113, 97, 114.1–114.5; 202/158

[56] References Cited

U.S. PATENT DOCUMENTS

| | | | |
|---|---|---|---|
| 3,179,389 | 4/1965 | Nutter | 261/114.1 |
| 3,410,540 | 11/1968 | Bruckert | 261/113 |
| 3,440,018 | 4/1969 | Eckert | 261/97 X |
| 4,159,291 | 6/1979 | Bruckert et al. | 202/158 X |
| 5,244,604 | 9/1993 | Miller et al. | 261/114.1 X |
| 5,407,605 | 4/1995 | Resetarits et al. | 261/113 X |
| 5,547,617 | 8/1996 | Lee et al. | 261/114.5 |

OTHER PUBLICATIONS

Resetarits, M.R., Miller, R.J., *Increase demethanizer efficiency and capacity*, Hydrocarbon Processinig, Oct. 1991.

Nutter Engineering, *Package Trays for Pipe–Size Process Vessels*, Bulletin PT–1, Undated.

*Primary Examiner*—Richard L. Chiesa
*Attorney, Agent, or Firm*—John G. Tolomei; John F. Spears, Jr.

[57] ABSTRACT

A novel fractionation column (1) internal structure consists of bundles of fractionation trays in which each upper tray rests upon the next lower tray. Only the lowermost tray of the bundle is supported by the column wall. Preferably the downcomers (13) of the upper tray rest upon the tops of the downcomers (13) of the next lower tray. The two crescent-shaped terminal decking sections (19) on opposite edges of the tray are supported from below by arch-shaped structures (17) anchored to the next lower tray.

11 Claims, 4 Drawing Sheets

SUPPORTS FOR STACKED FRACTIONATION TRAY END PIECES

FIELD OF THE INVENTION

The invention is a novel support structure for fractionation trays used in distillation columns which separate volatile chemical compounds via fractional distillation. The invention more specifically relates to a tray support structure for use in a tray bundle formed by stacking one or more fractionation trays on top of another tray of similar design.

BACKGROUND OF THE INVENTION

Fractionation trays are devices to bring vapor and liquid phases into contact during fractional distillation, also they are widely used in the petrochemical and petroleum refining industries to promote the multistage vapor-liquid contacting performed in fractionation columns. The normal configuration of a fractionation column includes about 10 to 120 individual trays. Normally each tray is the same. The trays are mounted horizontally at uniform vertical distances referred to as the tray spacing of the column. This distance may vary within different parts of the column but is normally considered constant.

The trays must be supported within the surrounding pressure vessel, referred to as the column. This is often done by support structures attached to the inside surface of the column. These structures, referred to in the art as rings, must be moved or replaced when the tray spacing in a column is changed. This can occur when it is desired to increase the number of trays in the column.

RELATED ART

The long and extensive use of fractionation trays has led to the development of many different designs for trays and of different methods of supporting them in a column. Examples of fractionation trays include the multiple downcomer design shown in U.S. Pat. No. 3,410,540 issued to W. Bruckert. This reference shows the preferred box-like downcomer design used in the subject apparatus and also describes several different possible mechanical arrangements of the liquid sealable outlet means present at the bottom of the downcomer. FIGS. 2, 3 and 5 of U.S. Pat. No. 5,547,617 issued to A. T. Lee et al. show other arrangements of the components of a fractionation tray having parallel rectangular downcomers spread across the tray. This reference also shows details of the support means employed to attach the individual trays to the wall of the column.

The details of one method of installing trays in a column are described in an article in the October 1991 edition of Hydrocarbon Processing. The structural features described in the article include the use of mounting rings attached to the sidewall of the column to support the trays. The article describes how the mounting ring for one tray can be supported by another ring rather than being attached to the wall of the column. This arrangement can be employed when it is desired to increase the number of trays in a column without attaching new support rings to the column wall.

One type of distillation apparatus available commercially is the "cartridge" or "package" tray system, which is normally employed in relatively small diameter low flow rate columns. An example of this system is shown in U.S. Pat. No. 3,179,389 issued to I. E. Nutter. The trays are assembled in groups held together by extension rods and spacing tubes, and the preassembled tray groups are loaded into the top of the column. The first group rests on a support located below the first tray, and the other groups rest upon this lowermost group. The trays apparently do not rest upon one another. Each tray is sealed against the inside surface of the column with a gasket. Mechanical details of one version of this system are provided in Bulletin PT-1 from Nutter Engineering.

SUMMARY OF THE INVENTION

The invention is a novel apparatus for use as a fractionation column tray employed in the separation of volatile chemical compounds. A preferred embodiment of the invention is characterized by the fractionation trays of the column being separated into groups of two or more trays, with only the lowermost tray of the grouping being supported by a ring or other support physically attached to the wall of the column. The upper trays of the group rest upon the lowermost tray. The downcomer(s) of the upper tray preferably contacts the lower tray to provide support for the central regions of the tray. The terminal or edge sections of tray decking between the downcomer and the column wall are supported in part by an arch-like support member attached to the next lower tray. This arrangement provides several advantages including a reduced time for the construction or revamping of a particular column and a reduced cost for the overall system and installation.

One embodiment of the subject invention may be characterized as an apparatus for use within a fractional distillation column comprising an enclosed cylindrical outer column having upper and lower ends and a cylindrical inner surface, which apparatus comprises an upper first and a lower second fractionation tray of similar design, with the fractionation trays having a plurality of downcomers which comprise a sidewall which extends away from a vapor-liquid contacting area formed by perforated decking, and with the downcomers defining two terminal decking sections located at the outer periphery of the upper first tray on opposite sides of the upper first tray; and a support for a terminal decking section comprising an arch having its feet anchored to the lower second tray and a peak attached to the terminal decking section of the upper first tray.

DETAILED DESCRIPTION AND PREFERRED EMBODIMENTS

Fractionation columns find utility in the separation of a wide variety of chemical compounds in the petroleum refining, petrochemical and chemical industries. They are used, for instance, in the separation of various paraffinic hydrocarbons such as the separation of butanes and pentanes, in removing contaminants including water from hydrocarbon streams and the separation of various alkyl aromatic hydrocarbons such as the separation of toluene from xylenes. Fractionation trays are also used for the separation of oxygenates such as ethers or alcohols from hydrocarbons, the separation of inorganics such as halogenated compounds, fluorocarbons and elemental gases and other separations too numerous to mention. Fractionation columns and trays therefore have great utility in a variety of industries.

Vapor generated at the bottom of the column rises through the tray which supports a quantity of liquid on its upper surface. The passage of the vapor through the liquid generates bubbles referred to as froth. The high surface area of the froth helps to quickly establish a compositional equilibrium between the vapor and liquid phases on the tray. The vapor loses less volatile material to the liquid and thus becomes slightly more volatile as it passes upward through each tray. The liquid separates from the froth and travels downward to the next lower tray. This froth formation and separation is performed on each tray. Trays therefore perform the two functions of contacting the rising vapor with liquid and then allowing the two phases to separate and flow in different directions. When the steps are performed a suitable number of times, the process can lead to highly effective separation of chemical compounds based upon their relative volatility.

Fractionation columns are often revamped in order to increase the capacity or separation effectiveness of the column. If the column contains fractionation trays, the revamp normally involves modifications to the fractionation tray systems. These modifications may include the installation of a completely different type of fractionation tray or the installation of a different number of fractionation trays or a combination situation in which an increased number of a different type of fractionation tray is installed in the column. In any situation this revamping of the fractionation column is a labor-intensive situation which must occur within a short turnaround time and within the close confines of the column. The fact that the removal of the old trays and the installation of the new trays must occur within these close confines increases the time necessary for the revamping procedure. This in turn results in the column being out of service for a longer time and the overall petrochemical or petroleum refining unit in which the column is employed also being out of service for at least this same period of time. It is therefore desirable to develop systems which lead to faster and more economical revamping of fractionation columns and it is an objective of the subject invention to provide such a system. It is a further objective of the invention to minimize the amount of work which must be done to attach or move the support elements attached to the internal surface of a fractionation column at those times at which fractionation trays are installed or changed within the column. Other objectives are to simplify tray design and to reduce the installed cost of fractionation trays.

In the subject invention two or more tray-like vapor-liquid contacting systems are nested together into a single unit characterized in that only the lowermost of these vapor-liquid contacting trays is supported by a support device attached to the inner surface of the wall of the fractionation column. Each of the individual vapor-liquid contacting trays or subunits will comprise at least one downcomer. Preferably they will comprise a plurality of individual downcomers. Most preferably they will comprise several parallel downcomers separated by areas of perforated decking, with the decking comprising a horizontal planar surface which defines the plane of the tray.

Preferably each of the trays in a subunit or grouping of trays according to the invention has a similar structure. However, there is no set requirement in the subject invention for each of the vertically adjacent trays to have an identical structure. The trays may differ in a minor regard such as the relative amount of decking versus the downcomer inlet area provided on a tray, or the size and distribution of the vapor perforations or passageways in the decking area, the construction of the decking area due to the necessity of the upper trays being self-supporting (not receiving support from the column) or by the presence or absence of various mechanical stiffeners, connection devices, etc. The vertically adjacent trays of any grouping may also be significantly different, such that, for instance, the lowermost tray may comprise the preferred rectangular trough-like downcomers while the upper trays would comprise the alternative V-shape downcomers.

An additional feature of embodiments of the invention is the presence of an intentional gap left between the outer edge of the upper fractionation trays of each grouping of trays and the inner surface of the column wall. In the prior art it is inherent that some space would be left between these elements to facilitate the installation of the tray into the column, that is to allow some leeway for the tray to fit within the column wall. The gap would then be sealed as by an overlay or by the tray resting on the support ring. In the subject invention there may be a significant unsealed gap left at this point. Further, this gap is distinguished by the fact that no effort is made to close the gap as by providing an overlapping element between the edge of the tray and any supporting element attached to the column wall. That is, the column internal wall surface is substantially smooth. No means is attached to the column wall or to the tray for support of the upper tray(s) or for sealing the gap between the inner surface of the column and the edge of the tray(s). This preference for a gap however does not overrule the possibility of employing several adjustable bar-like extensions which extend across the gap to stabilize the entire group structure within the column. That is, three or more rod-like fingers could project from the tray at different points and touch the column wall for the purpose of preventing the tray from rocking or moving from side to side. This may also be beneficial to prevent the upper tray from moving in a way which may eventually erode or cause damage to either tray at the points of contact between trays. These positioning devices may also aid in maintaining the position of the upper tray if such positioning is critical to adequate support and structural strength of the unitary system.

The subject invention finds particular utility with multiple downcomer type trays for at least two reasons. First, the structure of this type of tray with its parallel downcomers spread across the surface of the tray results in a structure highly adaptable to a stacked configuration without the addition of any significant additional structure. The lower tray(s) may need to be engineered for a higher load, but the number of tray pieces and their overall design can remain unchanged. Second, the long length of the available downcomer inlets leads to multiple downcomer trays normally producing a lower froth height. This, and the lower pressure drop which accompanies it, allows multiple downcomer trays to be installed at lower tray spacings. This is conducive to using a stacked configuration.

The subject concept includes the use of trays of totally conventional design in a stacked configuration. However, it is recognized that this could lead to undesirably short tray spacings, and the option exists of redesigning the trays to increase the tray spacing. For instance, the total height of the downcomer sidewall can be increased. The height of the portion of the downcomer wall which projects above the decking could be increased with openings in the wall being provided to compensate for the increased height. The height of the portion below the decking may also be increased. Another option is to employ "antijump" baffles extending vertically out of the downcomer openings, with the upper tray resting on the preferably castellated upper edge of the baffle.

Figure 1:
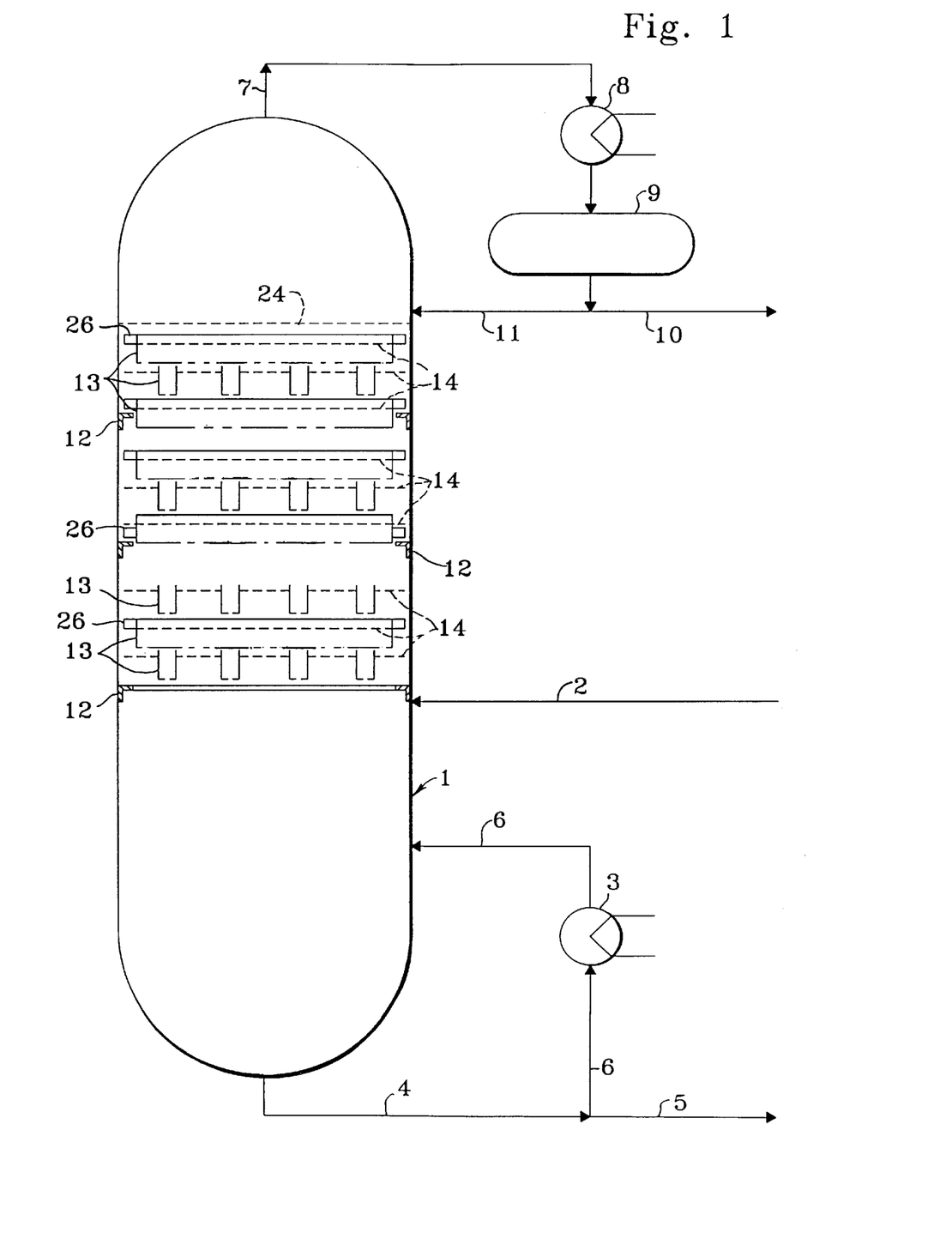
FIG. 1 is a simplified partially sectioned drawing of a fractionation column 1 containing three groupings of three fractionation trays. In each group only the bottom tray rests upon a support ring 12 attached to the inner surface of the column.

Referring now to FIG. 1, there is shown a fractionation column 1 which except for the subject invention may be built in a customary manner according to the prior art. The column comprises a vertical cylindrical process vessel of customary design having enclosed upper and lower ends and associated vapor and liquid transfer lines. The transfer lines include a feedline 2 which provides a mixture of hydrocarbons or other chemicals to the fractionation column for separation therein. While the drawing illustrates the feedline 2 entering a midpoint of the column, it could enter nearer either the top or the bottom of the column. The feed stream of line 2 could in some instances even be admixed with the reflux liquid or passed into the overhead receiver of the column. The inventive concept resides in the structure of the vapor-liquid contacting apparatus employed within the column and thus the external lines, outer vessel and external equipment do not form a part of the invention or a limitation to the invention. They are shown only for ensuring an understanding of the structure and operation of the invention.

Upon entering the fractionation column, the chemical compounds of the feed are separated with the more volatile compounds entering the vapor phase which rises through the column. The most volatile compound(s) are concentrated into an overhead vapor stream which exits the upper end of the fractionation column 1 through the overhead vapor line 7. The overhead vapor stream passes through the overhead condenser 8 wherein indirect heat exchange results in the condensation of at least a sizeable portion of this stream prior to passage of the overhead stream into the overhead receiver 9. Liquid is withdrawn from the overhead receiver 9 and divided into a net overhead product stream removed from the column via line 10 and a reflux stream returned to the column through line 11. The returning liquid-phase reflux material is distributed in a uniform manner over the cross-section of the column by means of a distributor 24.

The reflux liquid flows onto a topmost fractionation tray and then enters the downcomers 13 distributed across the tray. In the embodiment shown in FIG. 1, three separate fractionation trays are mounted upon a single support ring 12 near the upper end of the column. Each of these trays comprises four downcomers 13. Each tray also comprises horizontal areas of perforated tray decking 14 of a conventional nature, with the tray decking extending between the sidewalls of the downcomers 13.

The liquid phase flows downward through the column gradually changing in composition. After passing through the third bundle of trays shown in FIG. 1, the descending liquid becomes admixed with the liquid-phase components of the feedstream entering through line 2. The resultant liquid phase material would continue downward through the lower portion of the column 1. The vapor-liquid contacting devices employed in the lower portion of the column are not shown for simplicity. These devices may be the same as those employed in the upper portion of the column or they may differ. They may differ in being of a totally different tray type such as crossflow trays or the trays may be of the same type, that is, multiple downcomer trays but with each tray being individually supported by the column. Alternatively, the lower portion of the column could contain packing material instead of trays. Regardless of the composition of the vapor-liquid contacting device(s) present in the lower portion of the fractionation column 1, a stream of liquid phase material referred to as the bottoms liquid is removed at the lowermost end of the column through line 4. This liquid contains the least volatile components of the feed. The bottoms liquid is divided into a first portion carried by line 5, which is removed from the separation process as the net bottoms stream, and a second portion which is passed through line 6 into the reboiler 3. Heat energy is added to this reflux stream in the reboiler 3 typically causing at least partial vaporization and some heating of the liquid flowing through this line. The thus formed reboiling material is then passed into the bottom of the fractionation column through line 6 adding the necessary heat and vapors to the bottom of the column to perform fractional distillation.

Figure 2:
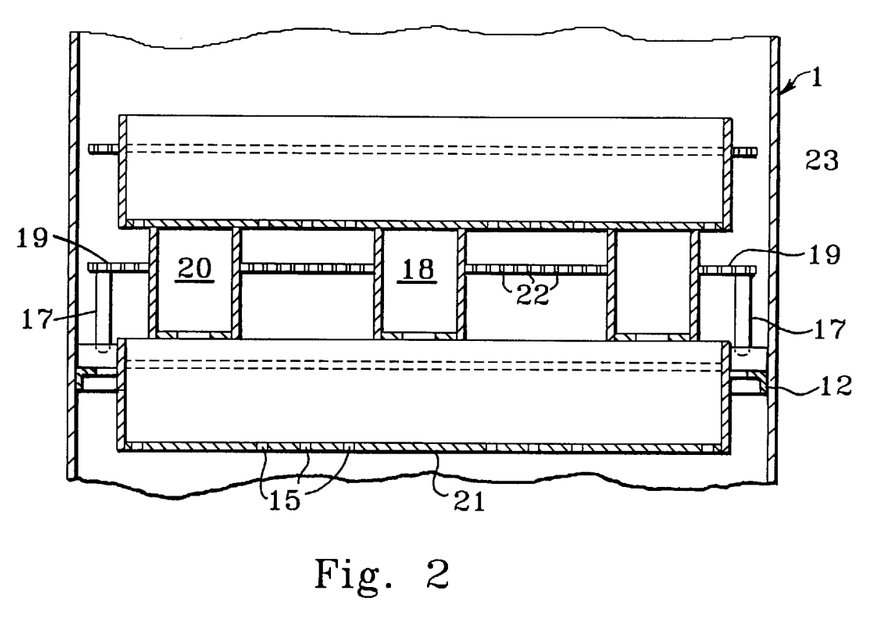
FIG. 2 is an expanded and more detailed depiction of a group of the multiple downcomer fractionation trays shown in FIG. 1.

FIG. 2 is a cross-sectional diagram looking horizontally across a small portion of the fractionation column containing three trays similar to those of FIG. 1. This figure shows three multiple downcomer fractionation trays, with two of the trays being stacked upon the lowermost tray. The structure of each of the trays is essentially identical. That is, each of the three trays comprises three rectangular box-like downcomers 13 of similar design separated by planar decking 14 through which rising vapor passes. Each downcomer is formed by two parallel planar sidewalls 18, two planar endwalls 20 and a single downcomer bottom plate 21. In the embodiment shown in this figure, the sidewalls and endwalls are imperforate and only the bottom plate has perforations intended for liquid flow when the column is on stream. The total size of the perforations or downcomer outlets 15 in the bottom plates are set sufficient to handle all of the downward liquid flow through the column when the column is operating. FIG. 2 also illustrates that the liquid sealable openings 15 in the bottom of the downcomer seal plate are spaced apart and grouped such that liquid descending from the downcomer falls upon the decking 14 rather than into the downcomer of the next lower tray. These openings are therefore distinguishable from other much smaller and less numerous openings sometimes provided on fractionation trays for the purpose of allowing the low spots of a tray to drain when the tray and the fractionation column as a whole are being taken out of service. Embodiments having different downcomer structures would also have this same on-stream liquid capacity.

A central point of the subject invention resides in an upper fractionation tray resting upon the next lower tray. Preferably this comprises resting upon an upward extending portion of the next lower tray such as the sidewalls forming the downcomer of the lower tray. A fundamental part of the invention is supporting the two terminal decking sections 19 on opposing edges of the upper tray(s) by arch-like supports attached to the downcomer end plates or sidewalls of the next lower tray. As may be seen from FIG. 2, there is no support ring or lip 12 provided for supporting the middle fractionation tray or for the upper fractionation tray. These trays rest solely upon the next lower tray and there is no attachment to the fractionation column. While means may be provided to secure the trays to one another and/or to prevent their movement from side to side within the column, the upper (supported) trays are not attached to traditional column mounted support means. Preferably, there is intentionally a significant gap 23 left between the outer edge of the decking 14 of the tray and the inner surface of the fractionation column. While in practice an assembled fractionation tray must be smaller than the internal diameter of the column to allow its installation and movement, in the subject invention this gap 23 is larger than this required spacing. It would be customary in the art to attempt to totally seal any gap such as this by means of an underlying support ring or overlaying plate. In the subject invention this gap is on the order of from 1½ to 5 centimeters and more preferably is at least 2 centimeters wide as measured from the edge of the decking to the inner surface of the cylindrical wall of the column.

FIG. 2 illustrates the use of an arch 17 to support the terminal decking material 14 located in the two moon or crescent sections 19 of the middle tray, that is, those sections of the tray located between the outermost downcomers and the wall of the column. The similar arches used on the upper tray are hidden in this view. Additional support for this decking section is required as only one side of this decking section is attached to a downcomer sidewall. In the prior art this edge portion of the decking material is supported by an attachment on the column, as through a ring 12. The absence of such a ring in the subject invention eliminates this mode of support.

Figure 3:
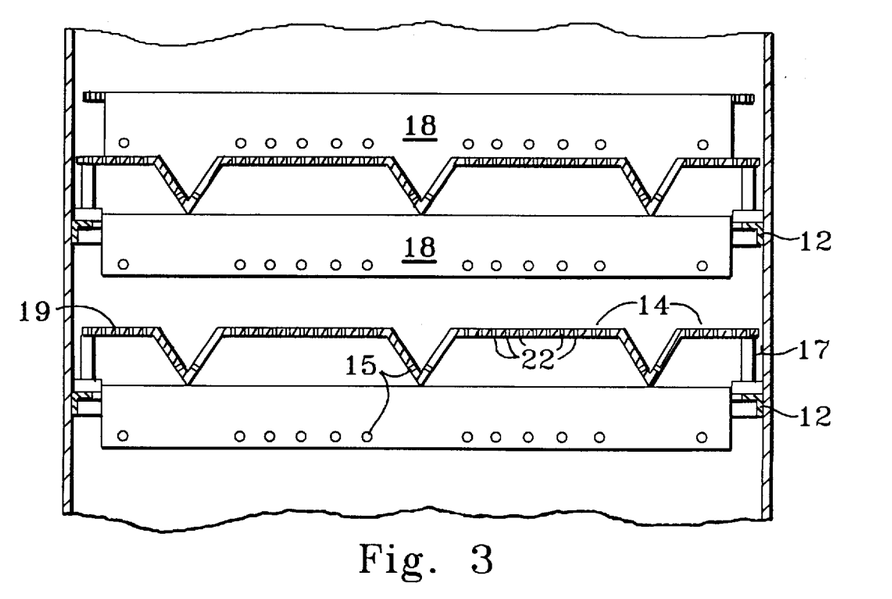
FIG. 3 illustrates a different embodiment of the invention in which the fractionation trays comprise V-shaped downcomers.

FIG. 3 is a depiction similar to FIG. 2 except that a different type of fractionation tray is employed. The trays depicted in FIG. 3 do not have the rectangular downcomer structure of those depicted in FIG. 2. Rather they have a V-shaped structure formed by two planar sidewalls 18 which are joined together at their lowermost edge. The liquid sealable outlet holes of the downcomers are preferably not located at the very bottom of the downcomers but are instead located in the sidewall of the downcomer. This has been found to have beneficial effects including an increased ability to have the liquid eject or jet outward from the downcomer for better distribution across the decking material 14 of the next lower tray. The liquid falls upon the decking 14 and is contacted by vapor rising upward through the perforations 22 in the decking thereby forming froth which occupies at least a sizeable portion of the volume between the trays. The froth flows into the rectangular inlet at the top of the downcomer and then begins to separate. The released vapor rises out of the downcomer leaving the clear liquid in the bottom of the downcomer.

FIG. 3 illustrates an upper bundle of three fractionation trays and a lower bundle of two fractionation trays. In a manner similar to that shown in FIG. 2, the terminal portions of the decking 19 of the trays are secured in place by one or more arch-shaped supports 17. It should be noted that the arches only restrain movement of the terminal decking portions of the tray. They do not support the tray itself, and may in fact not prevent upward deflections possible with an abnormally high vapor rate. The lower tray of the bundle is supported by an L-shaped ring 12 which encircles the inner surface of the column. Depending on the available opening at the top of the fractionation column, specifically whether the entire upper end of the column is removable, it may be possible to construct bundles of three or four fractionation trays bolted together at a number of places in the manner shown by connecting arches 17 and to then lower the fabricated bundle into the column.

Figure 4:
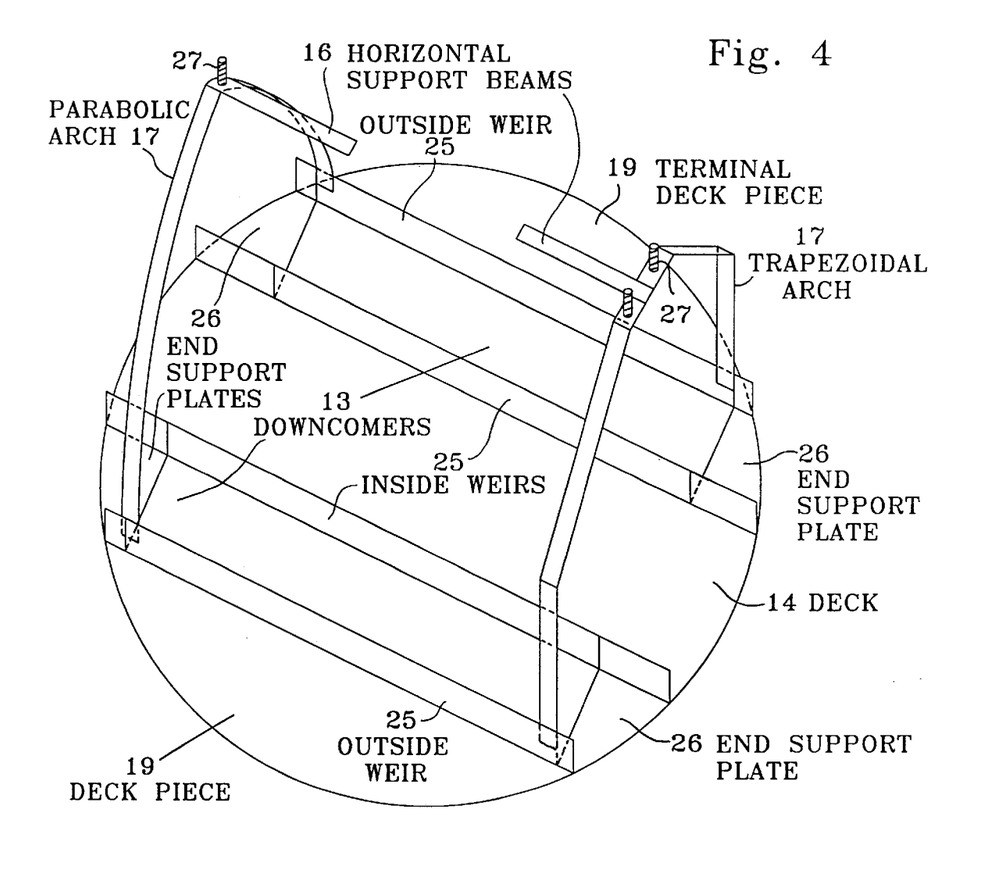
FIG. 4 illustrates a lower tray and two different arch-shaped supports 17 which would support terminal decking sections 19 of the next higher tray.

FIG. 4 shows two different designs for the supports 17. On the left hand side of the illustrated tray a parabolic arch 17 is shown attached to the upper portion actually an upward extension of the sidewall of the downcomer. On the right hand side of the tray a trapezoidal arch 17 having straight supporting sections is shown. The tray comprises three sections of decking 14, with two of them being the crescent shaped terminal pieces 19 at the two sides of the tray. Independent of the number of downcomers on the tray, when installed in the column these two terminal decking pieces are located on opposite sides of the tray between the end downcomer and the inner surface of the cylindrical wall of the column. The bottom end of the legs of the trapezoidal arch are shown attached to the weirs 25 of the tray below. They may alternatively be attached at other points such as to the decking adjacent to the downcomers. Attachment to the upright portion of end support plate 26 is preferred, with the method of attachment being such that the legs of the arch cannot pivot about the connection. The exact point of attachment is primarily set by practical considerations such as mechanical strength and cost of fabrication and does not form a limitation to the apparatus. An attachment near or beyond the end of the downcomer is preferred so that the arch is located closer to the outer edge of the overlying terminal decking portion.

FIG. 4 illustrates that the top portion or peak of the arch pieces 17 can extend horizontally for a significant distance and can be attached to the supported crescent section of decking by several connection devices 27. The slanted or inclined sections of the arch (as compared to the horizontal section of the crown) can be located totally over the end support plates 26 or over the inlets to the downcomer such that the length of the horizontal section between the legs can be equal to the distance between two adjacent downcomers. In this embodiment the extended horizontal span of the top portion of the support 17 makes it resemble a bridge more than an arch.

A horizontal support beam or brace 16 is preferably installed at the top of the arch-like support 17. This element extends perpendicular to the arch-shaped support 17 and preferably extends to the sidewall 18 of the downcomer adjacent to the supported crescent deck section 19 of the tray above. The top surface of the brace 16 can be located against the underside of the decking of the supported crescent section. However, it is preferred that the brace is inclined such that it slopes downward toward the downcomer at an angle of 8–20 degrees from horizontal.

FIG. 4 also illustrates the preferred unitary nature of the supports 17. Preferably the arch is made from a single piece of metal similar to the metal used to fabricate the sidewalls of the downcomer. For example the arches may be fabricated from 8 or 10 gauge carbon or stainless steel depending on the corrosiveness of the fluids being processed. It is possible, but not preferred, to assemble the support 17 from several separate pieces held together by bolts or welded together. The support may also differ in thickness or width along its length to compensate for increased loadings. That is, some portions of the arch can be thicker to be of higher strength or stiffness. The rigidity of the arch may be increased with braces.

Figure 5A:
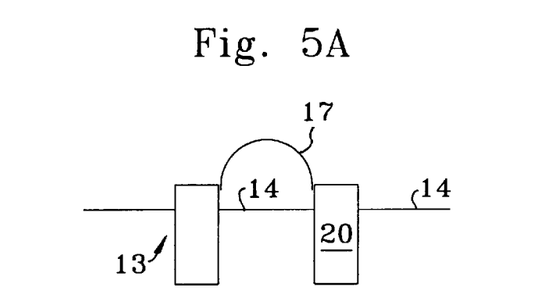
FIGS. 5A, 5B and 5C show an end view of three alteractive arch-shaped support structures 17.
Figure 5B:
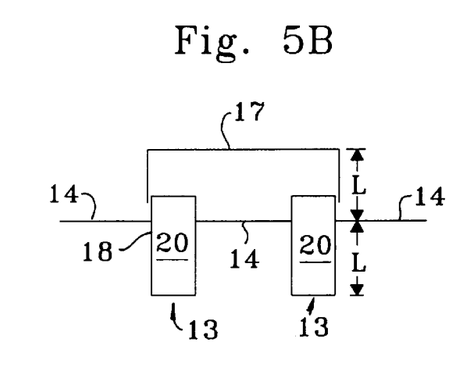
Figure 5C:
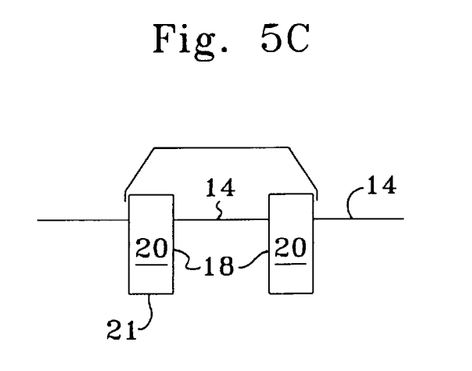

FIGS. 5A, 5B and 5C show three different alternate variations in the structure of the arch 17 labeled as 's' (span), 't' (trapezoid) and 'p' (parabolic). The span configuration attached to the external sidewalls 18 of two adjacent downcomers 13 is preferred. The distance 'L' is the tray spacing and shows the height of the arch 17 above the tray deck being equal to the length of the downcomer below the tray decking 14. Each tray comprises three sections of decking 14, a central section which is nearly rectangular and two crescent-shaped terminal or end pieces. The transverse alignment of the downcomers of vertically adjacent trays means that the arch 17, located near the end of the downcomer, will support a crescent-shaped end section of decking of the overlying tray. Other mechanical variations including other shapes or the use of multiple arches to support a single terminal decking section are easily derivable. For instance, three individual arches could be attached to the ends of downcomers to support a single terminal decking section of a large diameter tray.

The subject invention is directly applicable to multiple downcomer trays such as shown and described in the previously cited U.S. Pat. No. 3,410,540. Multiple downcomer trays have several distinguishing physical characteristics. For instance, a multiple downcomer tray does not have a "receiving pan". This is the normally imperforate section located below an outlet downcomer opening. It is the imperforate area of a tray upon which the liquid descending through the downcomer impacts before passing horizontally onto the decking of the tray. Receiving pans are normally located directly below the downcomer leading from the next above conventional fractionation tray. The horizontal decking surface area of the preferred embodiment of a multiple downcomer fractionation tray is divided into depressed areas functioning as downcomers and flat vapor-liquid contacting areas normally referred to as decking. There are no imperforate areas allocated to receiving descending liquid from the tray located immediately above.

Another distinguishing feature of a typical multiple downcomer type fractionation tray is the provision of a relatively large number of parallel downcomers evenly spaced across the tray. Each tray can employ from one to fifteen or more downcomers. The downcomers are spaced relatively close together compared to the downcomers of crossflow fractionation trays as they are spread across the surface of the tray rather than just being at the periphery of the tray. The distance between adjacent downcomers (measured between their side walls) of a multiple downcomer tray will be between 0.2 and 2.0 meters and is preferably less than 0.5 meter. This results in a tray having a unique design consisting of the alternating decking areas and downcomer means evenly spaced across the upper surface of the fractionation tray.

The downcomer means of a multiple downcomer tray is also unique compared to the downcomers normally employed upon crossflow fractionation trays. The downcomer means do not normally extend downward all the way to the next fractionation tray. Rather they stop at a much higher intermediate level located in the void volume between the two trays. The downcomer descending from the tray above therefore customarily stops well above the deck surface of the lower tray and the inlet to the downcomers of the tray below. Thus there is no inlet weir at the bottom of the downcomer of the tray as there is on a crossflow tray. In the subject invention the stacking of the trays can lessen this feature.

Another distinguishing feature of a multiple downcomer fractionation tray is the provision of a liquid sealable outlet means near the bottom of the downcomer. The bottom of the downcomer is partially closed off to retard the direct downward flow of liquid out of all of the downcomer. This causes the intentional accumulation and retention of sufficient froth to allow the froth to separate into clear liquid and vapor. This liquid sealable outlet is located well above the deck of the tray located immediately below and is preferably at a level above the inlet of the downcomers associated with this next lower tray. The clear liquid is collected in the lower portion of the downcomer and spills forth upon the next lower tray through openings in the bottom of the downcomer. Some liquid may, if desired, also exit through openings in the downcomer side walls. The openings are grouped together and located such that the exiting liquid does not fall into a downcomer of the next lower tray. Details on various constructions of the liquid sealable outlet means for rectangular downcomers may be obtained by reference to U.S. Pat. No. 4,159,291 which is incorporated herein for its teaching in regard to the construction of rectangular downcomers, decking material and the liquid sealable outlets of the downcomers. Further background information on multiple downcomer tray designs is presented in U.S. Pat. Nos. 5,244,604 and 5,407,605.

In embodiments employing V-shaped downcomers, the perforations 15 in the downcomer side walls are preferably arranged in one or more rows running along the major axis of the downcomer. It is preferred that the holes are located in the side walls rather than along the bottom of a V-shaped downcomer. This helps impart horizontal velocity to the egressing liquid causing it to travel away from the downcomer. This is beneficial in spreading the liquid over the decking or any high surface packing which is located below the tray. Openings in the midportion of the wall may also be useful in directing the liquid onto the decking areas of the next tray below depending on the orientation and location of the lower tray decks. The perforations in the downcomer side walls are preferably circular but could have other shapes including horizontal or diagonal slots. The use of a smaller number of larger perforations is preferred although the perforations should be located more or less uniformly along the length of both side walls of the downcomer in a single row to again aid in spreading the liquid. As with rectangular downcomers, holes should not be located directly above, or to discharge into, the downcomers of the tray below. Circular openings of about 0.5–2.5 centimeters diameter are suitable. Another important factor in the placement of the downcomer perforations is the provision of an adequate distance between the upper surface of the tray, which may be coextensive adequate distance between the upper surface of the tray, which may be coextensive with the downcomer inlet, and the perforations to allow the entering froth to separate into clear liquid and vapor. This is important to good tray efficiency and performance in general. This distance should also provide sufficient liquid head to prevent the upward passage of vapor through the downcomer perforations. This desirable placement of the downcomer perforations can be characterized as being in the lower third of a V-shaped downcomer.

The deck portions between any downcomers on the tray are preferably substantially planar, that is flat, and orientated in a horizontal plane. These decking portions are preferably provided with uniformly distributed openings of adequate total cross-sectional open area to allow the expected vapor flow to pass upward through the tray at a suitable velocity. Uniform circular openings of a standard sieve tray are preferred but can be supplemented by vapor flow directing slots. The open area provided by deck perforations may vary from 5% to as high as 30–45% of the tray deck area. The circular perforations may be up to 1.87 cm (0.75 in) in diameter.

The apparatus according to the present invention can be in the form of a new apparatus or a modified existing apparatus. That is, the invention can be used in a new column or in an existing trayed column that may be modified to employ the subject invention. The subject invention finds particular utility when an existing column is being "retrayed" by the addition of more trays or with trays of a different kind. In this instance an existing support ring can be used to support a tray which in turn supports one or more trays resting upon the tray as shown in FIGS. 2 and 3. The subject invention may also be employed when a different type of tray, such as a multiple downcomer tray, is installed in place of a tray which did not have a complete support ring. The supports of the subject invention can be used instead of installing the missing portion of the support ring if the terminal decking section is aligned with the gap in the support ring. Not every supported tray may be adaptable to the use of the subject arch supports in this very limited embodiment.

The tray spacing, that is, the vertical distance between the trays will be lower with the subject invention. Multiple downcomer trays are often installed with a tray spacing of about 25 to 35 cm (10–14 inches). Tray spacings down to 25 cm (10 inches) are not unusual and the tray spacing for the subject invention can be as low as 17 cm (7 inches). The tray spacing within the stacked tray bundles can be different from that between the tray bundles. For instance, a larger vertical spacing, e.g., at least 10 percent greater, can be provided between the bundles.

One embodiment of the invention may accordingly be characterized as a fractionation tray bundle for installation in a vertical enclosed fractionation column having an upper first end and lower second end and used for the separation of volatile chemical compounds by fractional distillation, which tray bundle comprises an upper first fractionation tray comprising a plurality of parallel downcomers extending above and below an upper surface of the tray defined by tray decking, including two terminal decking sections on opposite sides of the tray, with the downcomers having liquid sealable outlets and being separated by perforated decking material; a lower second fractionation tray of substantially identical structure to the first fractionation tray, with the downcomers of the first fractionation tray being transverse to the downcomers of the second fractionation tray and extending downward and being supported by the second fractionation tray, with the liquid sealable outlets of the downcomers of the second fractionation tray being supported above the decking material of the first fractionation tray, and arch-shaped supports extending from the lower second tray to a point on the terminal decking of the upper first tray.

A further embodiment of the invention may be characterized as an apparatus for use as a fractionation column, which apparatus comprises an enclosed cylindrical outer column having upper and lower ends and associated reboiling and overhead condensing systems; and a plurality of tray bundles vertically spaced apart at uniform distances within the column, with each tray bundle comprising an upper tray which rests upon and is fully supported by a lower second tray by means which include an arch-shaped structure having a peak connected to the underside of a portion of decking of the upper tray and two legs which extend downward to the lower second tray.

What is claimed:

1. An apparatus for use within a fractional distillation column comprising an enclosed cylindrical outer column having upper and lower ends and a cylindrical inner surface, which apparatus comprises:
    a) an upper first and a lower second fractionation tray of similar design, with the fractionation trays having a plurality of downcomers which comprise a sidewall which extends away from a vapor-liquid contacting area formed by perforated decking, and with the downcomers defining two terminal decking sections located at the outer periphery of the upper first tray on opposite sides of the upper first tray, and
    b) a support for a terminal decking section comprising an arch having its bottom portion anchored to the lower second tray and a peak attached to the terminal decking section of the upper first tray.

2. The apparatus of claim 1 wherein the bottom portion of the arch is attached to a downcomer of the lower second tray.

3. The apparatus of claim 1 wherein a horizontal brace extends from the arch of the support toward a downcomer of the upper first tray.

4. The apparatus of claim 1 wherein the downcomers of each tray are formed from two inclined sidewalls which extend downward from the tray and join together at a bottom edge to define a V-shaped downcomer structure.

5. The apparatus of claim 1 wherein the bottom portion of the arch is attached to sidewalls of a downcomer of the second fractionation tray.

6. The apparatus of claim 1 further characterized in that the support is attached to two different downcomers or to an end support plate located between the end of the downcomers and the inner surface of the outer column.

7. The apparatus of claim 1 wherein the upper first tray is supported by the lower second tray.

8. The apparatus of claim 7 wherein the lower second tray is supported by means attached to the inner surface of the outer column and the upper first tray has a substantially circular periphery which is separated from the cylindrical inner surface of the outer column by a discoid gap.

9. An apparatus for use as a fractionation column, which apparatus comprises:
    a) an enclosed cylindrical outer column having upper and lower ends and associated reboiling and overhead condensing systems; and
    b) a plurality of tray bundles vertically spaced apart at uniform distances within the column, with each tray bundle comprising an upper tray which rests upon and is fully supported by a lower second tray by means which include an arch-shaped structure having a peak adjacent to the underside of a portion of decking of the upper tray and two legs which extend downward to the lower second tray.

10. The column of claim 9 wherein the apparatus comprises two unitary archshaped structures located on opposite sides of the trays.

11. A fractionation tray bundle for installation in a vertical enclosed fractionation column having an upper first end and lower second end and used for the separation of volatile chemical compounds by fractional distillation, which tray bundle comprises:
    (a) an upper first fractionation tray comprising a plurality of parallel downcomers extending above and below an upper surface of the tray defined by tray decking, including two terminal decking sections on opposite sides of the tray, with the downcomers having liquid sealable outlets and being separated by perforated decking material;
    (b) a lower second fractionation tray of substantially identical structure to the first fractionation tray, with the downcomers of the first fractionation tray being transverse to the downcomers of the second fractionation tray and extending downward and being supported by the second fractionation tray, with the liquid sealable outlets of the downcomers of the first fractionation tray being supported above the decking material of the first fractionation tray, and
    (c) arch-shaped supports extending from the lower second tray to a point on the terminal decking section of the upper first tray.

* * * * *